US012366336B1

(12) United States Patent
Qu

(10) Patent No.: US 12,366,336 B1
(45) Date of Patent: Jul. 22, 2025

(54) STRING LIGHT ASSEMBLY

(71) Applicant: Yonggui Qu, Linhai (CN)

(72) Inventor: Yonggui Qu, Linhai (CN)

( * ) Notice: Subject to any disclaimer, the term of this patent is extended or adjusted under 35 U.S.C. 154(b) by 0 days.

(21) Appl. No.: 18/928,700

(22) Filed: Oct. 28, 2024

(30) Foreign Application Priority Data

Aug. 2, 2024 (EM) ......................... 015068461-0001

(51) Int. Cl.
*F21S 4/10* (2016.01)
*F21V 3/02* (2006.01)
*F21V 17/10* (2006.01)

(52) U.S. Cl.
CPC .................. *F21S 4/10* (2016.01); *F21V 3/02* (2013.01); *F21V 17/10* (2013.01)

(58) Field of Classification Search
CPC .......................................................... F21S 4/10
See application file for complete search history.

(56) References Cited

U.S. PATENT DOCUMENTS 6,536,915 B1 * 3/2003 Chang ....................... F21S 4/10 362/237
2005/0185400 A1 * 8/2005 Hsu ........................... F21S 4/10 362/807

FOREIGN PATENT DOCUMENTS

TW M351306 U 2/2009
TW 200946825 A 11/2009
TW M387199 U 8/2010

* cited by examiner

*Primary Examiner* — Sean P Gramling
(74) *Attorney, Agent, or Firm* — Birch, Stewart, Kolasch & Birch, LLP

(57) ABSTRACT

A string light assembly comprises a light strip and multiple light housings. The light strip has multiple illuminating portions and a strip portion. The light housings are arranged at sites of the illuminating portions respectively. Each one of the light housings has two cover units and two limit holes. The cover units detachably engage with each other. Each one of the cover units has a base surface, an installing recess, and an engaging portion. The installing recess is recessed from the base surface, and the installing recesses of the two cover units together form a chamber, and a corresponding one of the illuminating portions is located in the chamber. The engaging portions of the two cover units are engageable with each other. The strip portion is disposed through the two limit holes. The user may easily mount the light housings to the light strip by simply buckling the two cover units.

16 Claims, 5 Drawing Sheets

STRING LIGHT ASSEMBLY

BACKGROUND

1. Field of the Invention

The present invention relates to string lights, especially to a string light assembly that is applied as a decoration.

2. Description of the Prior Arts

String lights are commonly applied as decorations to generate atmosphere of celebration. Conventional string lights usually comprise multiple light housings mounted on multiple cover seats of a light strip respectively as disclosed in the patent publications TW200946825 and TWM351306. When manufacturing the conventional string lights, the manufacturer needs to connect the cover seats to illuminate portions of the light strip respectively, and then adheres or screws light housings to the cover seats. Therefore, it is inconvenient to assemble the conventional string lights.

In addition, another patent publication TWM387199 has disclosed string lights that have a cover seat and a cover board together cover an illuminating portion of a light strip, the cover seat is configured to be inserted into a gap or a hole on walls or any other surfaces, and the illuminating portion is mounted on a light seat which is adhered to the light strip. Therefore, each one of the illuminating portions on the light strip can only illuminate toward one single direction, such that the string lights would only be suitable for arranged on a wall or ceiling. In other words, the usage of the string lights is limited.

To overcome the shortcomings, the present invention provides a string light assembly to mitigate or obviate the aforementioned problems.

SUMMARY

The main objective of the present invention is to provide a string light assembly that is easy to assemble.

The string light assembly comprises a light strip and multiple light housings. The light strip has multiple illuminating portions mounted on a strip portion. The multiple light housings are mounted on the light strip. The light housings are arranged at sites of the illuminating portions respectively. Each one of the light housings has two cover units and two limit holes. The two cover units detachably engage with each other, and the two cover units together surround a corresponding one of the illuminating portions. Each one of the cover units has a base surface, an installing recess, and an engaging portion. The base surfaces of the two cover units face towards each other. The installing recess is recessed from the base surface of the cover unit, and the two installing recesses of the two cover units together form a chamber, and the corresponding one of the illuminating portions is located in the chamber. The engaging portion is formed on the base surface, and the two engaging portions of the two cover units are engageable with each other. The two limit holes are formed on two opposite sides of the light housing, and the two limit holes spatially communicate with the chamber. The strip portion of the light strip is disposed through the two limit holes.

The two cover units of the light housing may be engaged together with the engaging portions of the two cover units combined together by the user, the user may easily mount the light housings to the light strip by simply buckling the two cover units. Thus, the string light assembly in this disclosure would be easy to assemble.

Other objectives, advantages and novel features of the invention will become more apparent from the following detailed description when taken in conjunction with the accompanying drawings.

DETAILED DESCRIPTION

Figure 1:
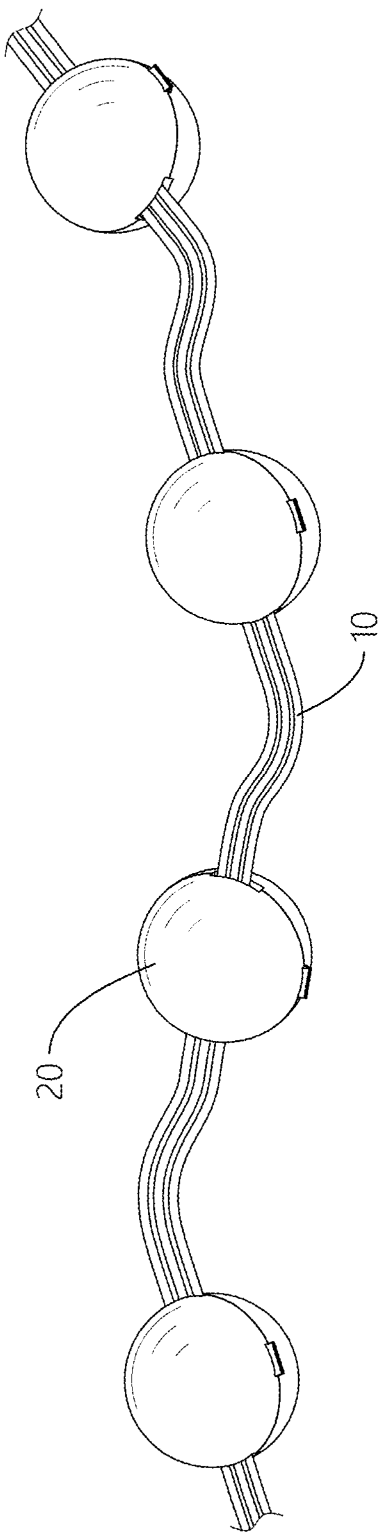
FIG. 1 is a perspective view of a string light assembly in accordance with the present invention.
Figure 2:
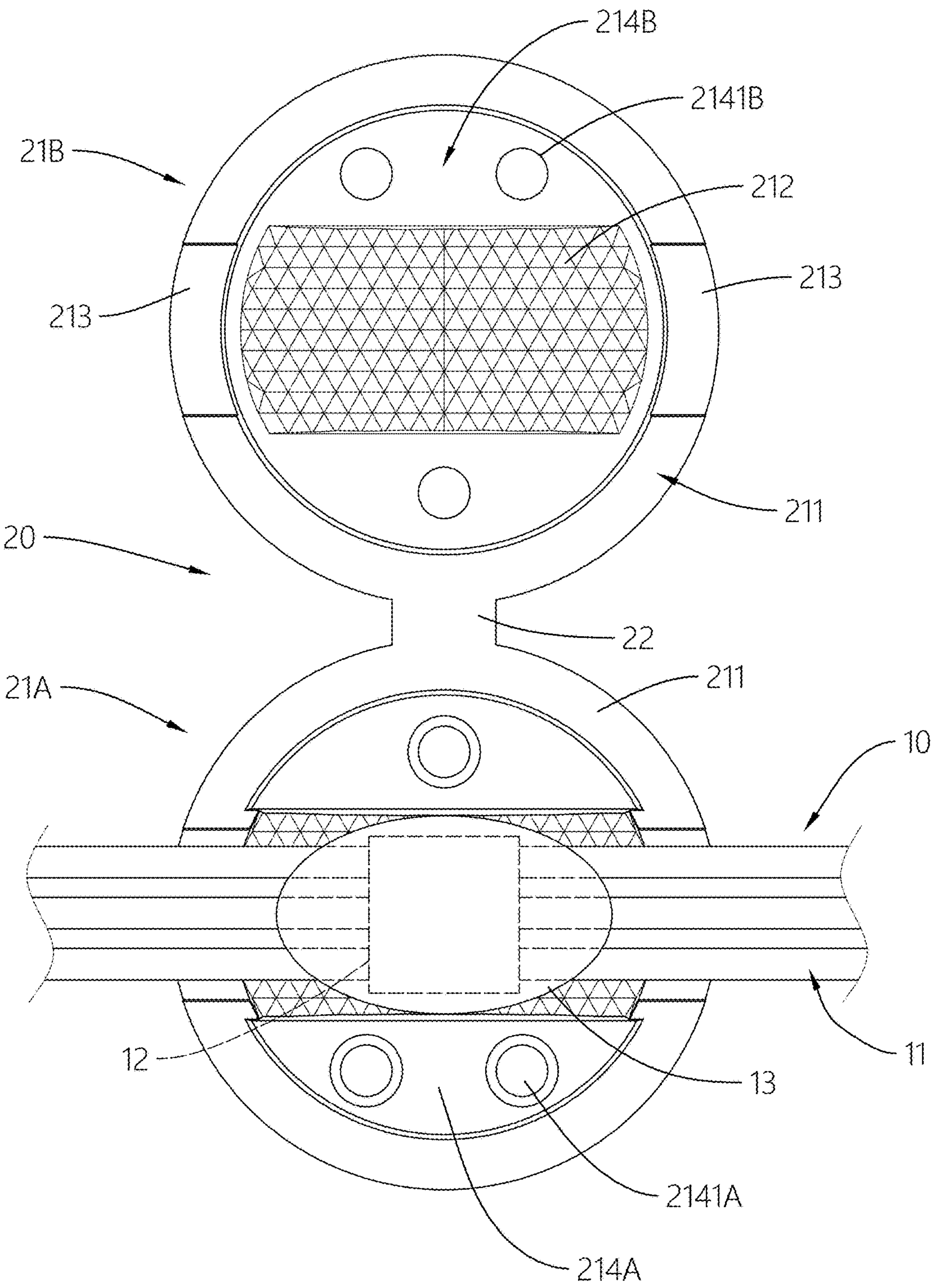
FIG. 2 is a partial top view of the string light assembly in FIG. 1, shown with the light housing opened.
Figure 3:
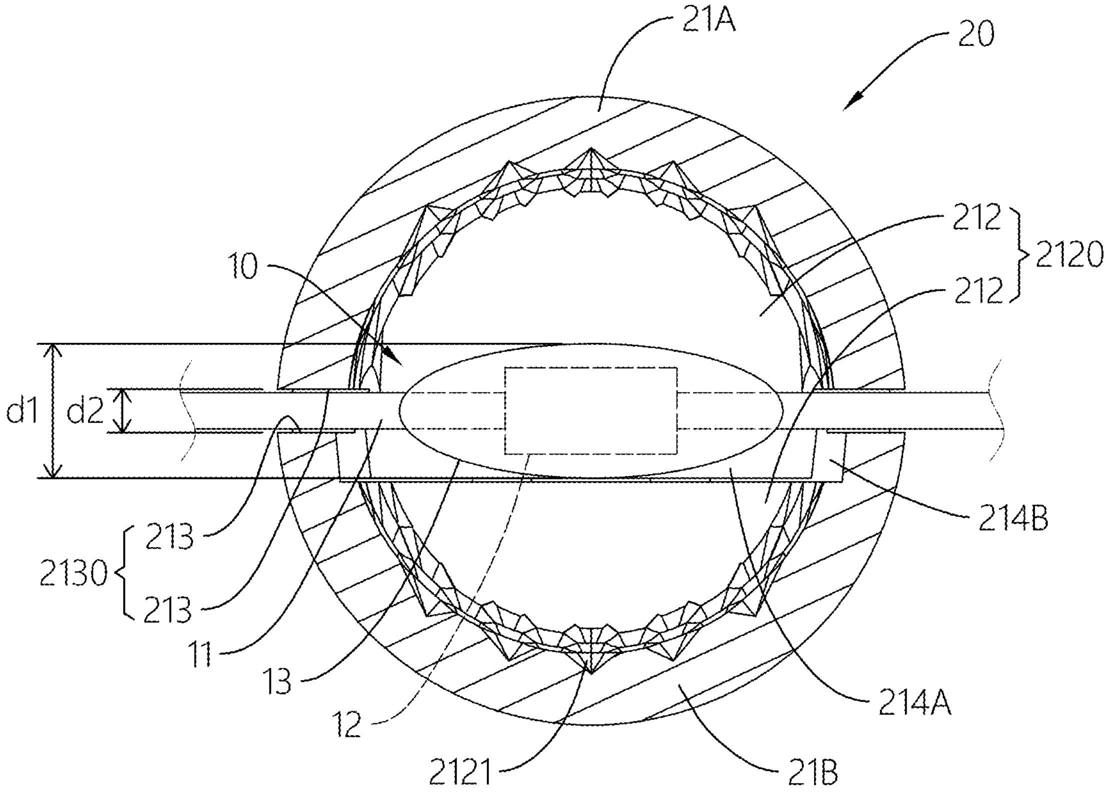
FIG. 3 is a partial cross-sectional view of the string light assembly in FIG. 1, shown with the light housing cross-sectioned.

With reference to FIGS. 1 to 3, a string light assembly in accordance with the present invention comprises a light strip 10 and multiple light housings 20. The light housings 20 are detachably mounted on the light strip 10, and the light housings 20 may be transparent or translucent.

The light strip 10 has a strip portion 11, multiple illuminating portions 12, and multiple limit portions 13. The illuminating portions 12 are mounted on the strip portion 11. To be more precise, the illuminating portions 12 are arranged spaced apart from each other along an extending direction of the strip portion 11. In this embodiment, the illuminating portions 12 are light-emitting diodes (LEDs) electrically connected to the strip portion 11 which includes several cables, but it is not limited thereto.

The limit portions 13 are mounted on the strip portion 11 and located adjacent to the illuminating portions 12 respectively. In this embodiment, each one of the limit portions 13 is cured resin which covers the corresponding illuminating portion 12. In addition, the limit portions 13 may be doped such that the light emitted from the illuminating portions 12 would be scattered, but it is not limited thereto. As shown in FIGS. 2 and 3, in this embodiment, the LED is directly soldered on the cables and completely covered by the resin, but it is not limited thereto.

The light housings 20 are mounted on the light strip 10. To be more precise, the light housings 20 are arranged at sites of the illuminating portions 12 respectively. In this embodiment, each one of the light housings 20 is spherical in shape, but it is not limited thereto.

Figure 4:
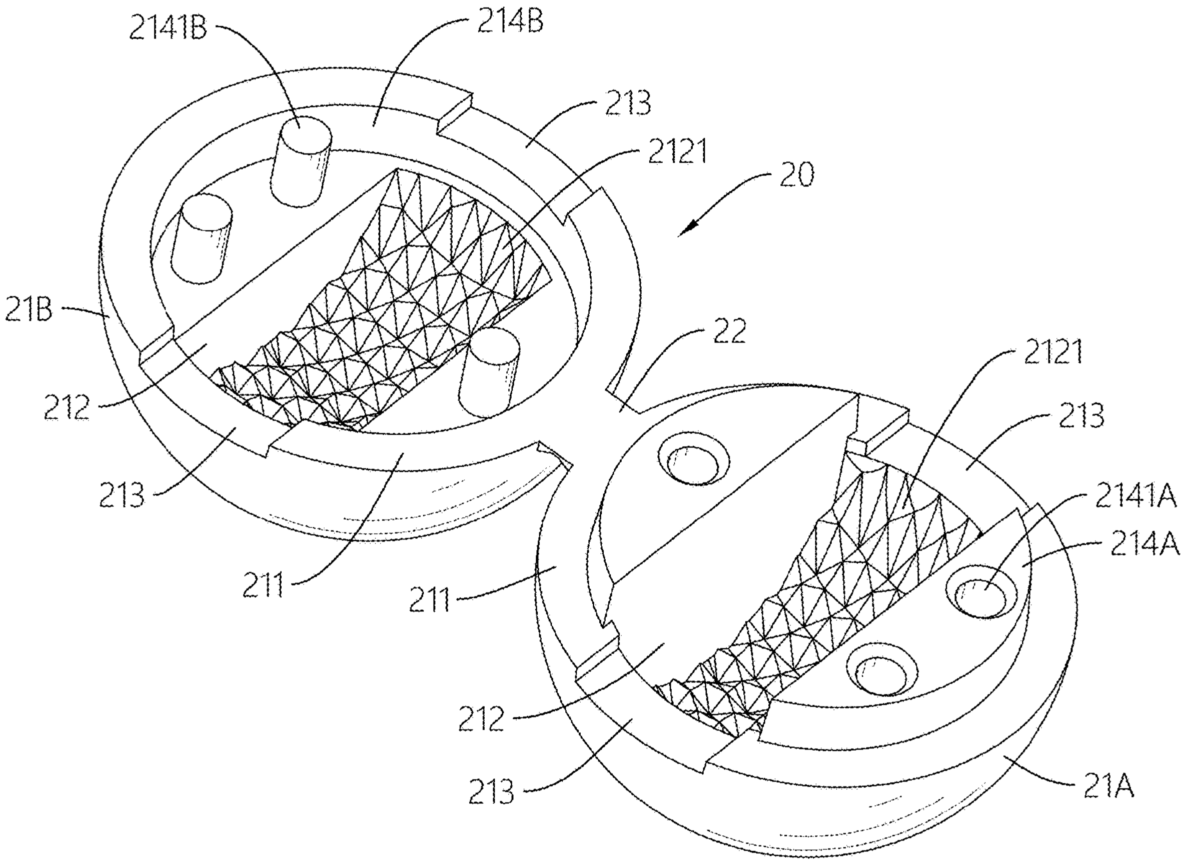
FIG. 4 is a perspective view of the light housing in FIG. 1, shown opened.
Figure 5:
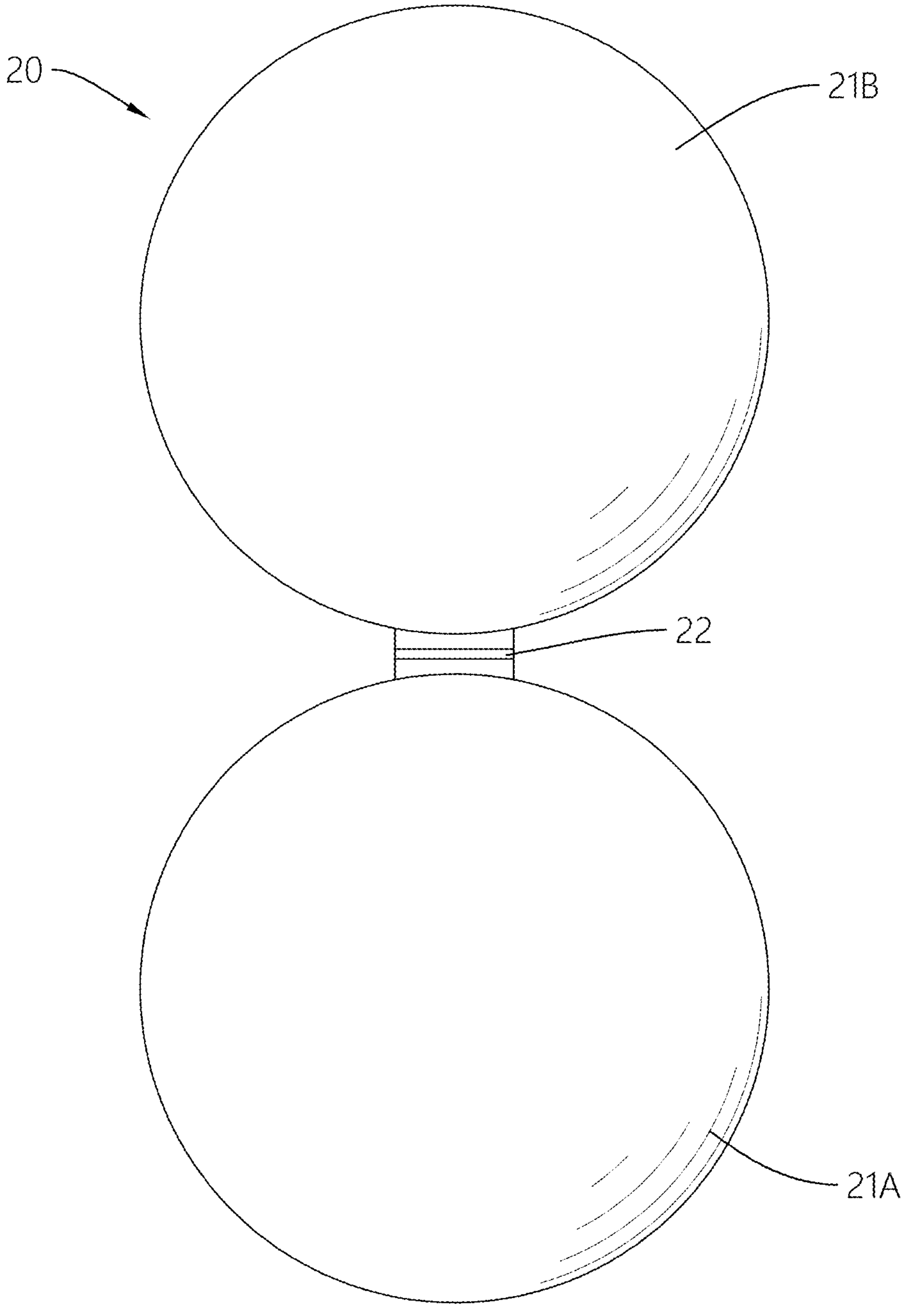
FIG. 5 is a bottom view of the light housing in FIG. 4.

With reference to FIGS. 3 to 5, each one of the light housings 20 has two cover units 21A/21B and a connecting unit 22, and the connecting unit 22 connects with the two cover units 21A/21B, but it is not limited thereto, in another embodiment, the light housing 20 may not have the connecting unit 22 and the two cover units 21A/21B are capable of separating from each other. The two cover units 21A/21B detachably engage with each other, and the two cover units 21A/21B together surround a corresponding one of the illuminating portions 12.

Each one of the cover units 21A/21B has a base surface 211, an installing recess 212, two notches 213, and an engaging portion 214A/214B.

The base surfaces 211 of the two cover units 21A/21B face towards each other. The installing recess 212 is recessed from the base surface 211 of the cover unit 21A/21B, and the two installing recesses 212 of the two cover units 21A/21B together form a chamber 2120. One of the illuminating portions 12 of the light strip 10 is located in the chamber 2120.

In this embodiment, a bottom surface of the installing recess 212 of each one of the two cover units 21A/21B is a concave surface, and multiple refraction recesses 2121 are recessed from the bottom surface of the installing recess 212. Each one of the refraction recesses 2121 is shaped as a hexagonal pyramid which tapers outwardly of the light housing 20, such that the light emitted from the illuminating portion 12 would be refracted when passing through the light housing 20 via the bottom surface of the installing recess 212.

The two notches 213 are recessed from the base surface 211 and respectively located at two opposite sides of the cover unit 21A/21B. The two notches 213 of the cover unit 21A/21B are aligned with the two notches 213 respectively of the other cover unit 21A/21B, such that the four notches 213 together form two limit holes 2130. The two limit holes 2130 are located at two opposite sides of the light housing 20 and spatially communicate with the chamber 2120, and the strip portion 11 of the light strip 10 is disposed through the two limit holes 2130.

As shown in FIGS. 1 to 3, when the light housings 20 are mounted on the light strip 10, each one of the limit portions 13 of the light strip 10 is disposed in the chamber 2120 of a corresponding one of the light housings 20, and the limit portion 13 is incapable of passing through each one the two limit holes 2130. To be more precise, a size of the limit portion 13 is greater than a size of each one of the two limit holes 2130 along at least one direction, such that the limit portion 13 would not pass the limit holes 2130 and be limited in the light housing 20. In this embodiment, as show in FIG. 3, a thickness d1 of the limit portion 13 is greater than a width d2 of each one of the two limit holes 2130, but it is not limited thereto.

The engaging portion 214A/214B is formed on the base surface 211 of the cover unit 21A/21B, and the two engaging portions 214A/214B of the two cover units 21A/21B are engageable with each other. In this embodiment, the engaging portions 214A/214B of the two cover units 21A/21B are structurally complementary for engagement with each other.

To be more precise, one of the two cover units 21A/21B may be a first cover unit 21A and the other one of the two cover units 21A/21B may be a second cover unit 21B. The engaging portion 214A/214B of the first cover unit 21A comprises an engaging protrusion 214A protruded from the base surface 211, and at least one mounting hole 2141A is formed on the engaging protrusion 214A. In this embodiment, a number of the mounting holes 2141A is three, and the engaging protrusion 214A has two parts respectively located at two opposite sides of the installing recess 212. One of the two parts of the engaging protrusion 214A has one mounting hole 2141A, and the other one of the two parts of the engaging protrusion 214A has two mounting holes 2141A, but it is not limited thereto.

The engaging portion 214A/214B of the second cover unit 21B comprises an engaging recess 214B recessed from the base surface 211, and the installing recess 212 is recessed from a bottom surface of the engaging recess 214B. The second cover unit 21B further comprises at least one mounting rod 2141B, and one end of the at least one mounting rod 2141B is connected to the bottom surface of the engaging recess 214B. A number of the mounting rods 2141B corresponds to the number of the mounting holes 2141A of the first cover unit 21A, and in this embodiment, the number of the mounting rods 2141B is three, and the three mounting rods 2141B are aligned with the three mounting holes 2141A.

When the first cover unit 21A is engaging with the second cover unit 21B, the engaging protrusion 214A is located in the engaging recess 214B, and the three mounting rods 2141B are disposed in the three mounting holes 2141A respectively, such that the first cover unit 21A and the second cover unit 21B may be combined firmly together.

The light housings 20 are easy to be mounted on the light strip 10. The user may set the light housings 20 on at the light strip 10 by simply buckling the first cover units 21A and the second cover units 21B together. In addition, since the thickness of each one of the limit portions 13 is greater than the widths of the two limit holes 2130, each one of the light housings 20 would be fixed to cover the corresponding illuminating portion 12 without slipping off. In addition, since the light housings 20 are transparent or translucent, the light emitted from the illuminating portions 12 would illuminate in a wide range of angle, i.e., illuminate along multiple angles, and illuminate without coverage by cover seats.

Furthermore, since the bottom surface of the installing recess 212 forms the refraction recesses 2121, when the string light assembly is turned on, the light passing through the light housings 20 would be refracted by the bottom surfaces of the installing recesses 212, and thus the light housings 20 would expand the illuminating ranges of the light emitted from the illuminating portions 12 and produce an artistic atmosphere to avoid monotony.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A string light assembly comprising:

a light strip having multiple illuminating portions mounted on a strip portion; and multiple light housings mounted on the light strip, the light housings arranged at sites of the illuminating portions respectively; each one of the light housings having:

two cover units detachably engaging with each other, and the two cover units together surrounding a corresponding one of the illuminating portions; each one of the cover units having:

a base surface, and the base surfaces of the two cover units facing towards each other;

an installing recess recessed from the base surface of the cover unit, and the two installing recesses of the two cover units together forming a chamber, and the corresponding one of the illuminating portions located in the chamber; and an engaging portion formed on the base surface, and the two engaging portions of the two cover units being engageable with each other;

two limit holes formed on two opposite sides of the light housing, and the two limit holes spatially communicating with the chamber; the strip portion of the light strip disposed through the two limit holes, wherein, one of the two cover units is a first cover unit, and the other one of the two cover units is a second cover unit: the engaging portion of the first cover unit comprises an engaging protrusion protruded from the base surface: the engaging portion of the second cover unit comprises an engaging recess recessed from the base surface, and the installing recess is recessed from a bottom surface of the engaging recess; and when the first cover unit is engaging with the second cover unit, the engaging protrusion is located in the engaging recess, and wherein, the first cover unit further comprises: at least one mounting hole formed on the engaging protrusion: the second cover unit further comprises: at least one mounting rod, one end of the at least one mounting rod connected to the bottom surface of the engaging recess; and when the first cover unit is engaging with the second cover unit, the at least one mounting rod is disposed in the at least one mounting hole.

2. The string light assembly as claimed in claim 1, wherein each one of the two cover units has:

two notches recessed from the base surface and respectively located at two opposite sides of the cover unit, the two notches of the cover unit aligned with the two notches of the other cover unit, such that the four notches of the two cover units together form the two limit holes.

3. The string light assembly as claimed in claim 1, wherein the light strip further comprises:

multiple limit portions mounted on the strip portion and located adjacent to the illuminating portions respectively; each one of the limit portions disposed in the chamber of a corresponding one of the light housings, and the limit portion being incapable of passing through each one the two limit holes.

4. The string light assembly as claimed in claim 2, wherein the light strip further comprises:

multiple limit portions mounted on the strip portion and located adjacent to the illuminating portions respectively; each one of the limit portions disposed in the chamber of a corresponding one of the light housings, and the limit portion being incapable of passing through each one the two limit holes.

5. The string light assembly as claimed in claim 1, wherein a bottom surface of the installing recess of each one of the two cover units is a concave surface, and multiple refraction recesses are recessed from the bottom surface of the installing recess.

6. The string light assembly as claimed in claim 4, wherein a bottom surface of the installing recess of each one of the two cover units is a concave surface, and multiple refraction recesses are recessed from the bottom surface of the installing recess.

7. The string light assembly as claimed in claim 5, wherein each one of the refraction recesses is shaped as a hexagonal pyramid and tapers outwardly with respect to a center of the light housing.

8. The string light assembly as claimed in claim 6, wherein each one of the refraction recesses is shaped as a hexagonal pyramid and tapers outwardly with respect to a center of the light housing.

9. The string light assembly as claimed in claim 1, wherein the light housing has:

a connecting unit connecting with the two cover units.

10. The string light assembly as claimed in claim 8, wherein the light housing has:

a connecting unit connecting with the two cover units.

11. The string light assembly as claimed in claim 1, wherein the light housing is shaped spherical.

12. The string light assembly as claimed in claim 10, wherein the light housing is shaped spherical.

13. A light housing configured to be mounted on a light strip, the light strip having multiple illuminating portions mounted on a strip portion, and the light housing comprising:

two cover units detachably engaging with each other, and the two cover units together surrounding a corresponding one of the illuminating portions; each one of the cover units having:

a base surface, and the base surfaces of the two cover units facing towards each other;

an installing recess recessed from the base surface of the cover unit, and the two installing recesses of the two cover units together forming a chamber, and the corresponding one of the illuminating portions located in the chamber; and an engaging portion formed on the base surface, and the two engaging portions of the two cover units being engageable with each other;

two limit holes formed on two opposite sides of the light housing, and the two limit holes spatially communicating with the chamber; the strip portion of the light strip disposed through the two limit holes, wherein, one of the two cover units is a first cover unit, and the other one of the two cover units is a second cover unit: the engaging portion of the first cover unit comprises an engaging protrusion protruded from the base surface; the engaging portion of the second cover unit comprises an engaging recess recessed from the base surface, and the installing recess is recessed from a bottom surface of the engaging recess; and when the first cover unit is engaging with the second cover unit, the engaging protrusion is located in the engaging recess, and wherein, the first cover unit further comprises: at least one mounting hole formed on the engaging protrusion: the second cover unit further comprises: at least one mounting rod, one end of the at least one mounting rod connected to the bottom surface of the engaging recess; and when the first cover unit is engaging with the second cover unit, the at least one mounting rod is disposed in the at least one mounting hole.

14. The light housing as claimed in claim 13, wherein each one of the two cover units has:

two notches recessed from the base surface and respectively located at two opposite sides of the cover unit, the two notches of the cover unit aligned with the two notches of the other cover unit, such that the four notches of the two cover units together form the two limit holes.

15. The light housing as claimed in claim 14, wherein a bottom surface of the installing recess of each one of the two cover units is a concave surface, and multiple refraction recesses are recessed from the bottom surface of the installing recess.

16. The light housing as claimed in claim 15, wherein each one of the refraction recesses is shaped as a hexagonal pyramid and tapers outwardly with respect to a center of the light housing.

* * * * *